Dec. 11, 1945.                    A. F. SCHWENDNER                    2,390,740
                                  GOVERNING APPARATUS
                                  Filed May 26, 1942                  3 Sheets-Sheet 1

WITNESSES:                                                            INVENTOR
                                                                      ANTHONY F. SCHWENDNER.
                                                                      BY
                                                                      ATTORNEY

Dec. 11, 1945.　　A. F. SCHWENDNER　　2,390,740
GOVERNING APPARATUS
Filed May 26, 1942　　3 Sheets-Sheet 2
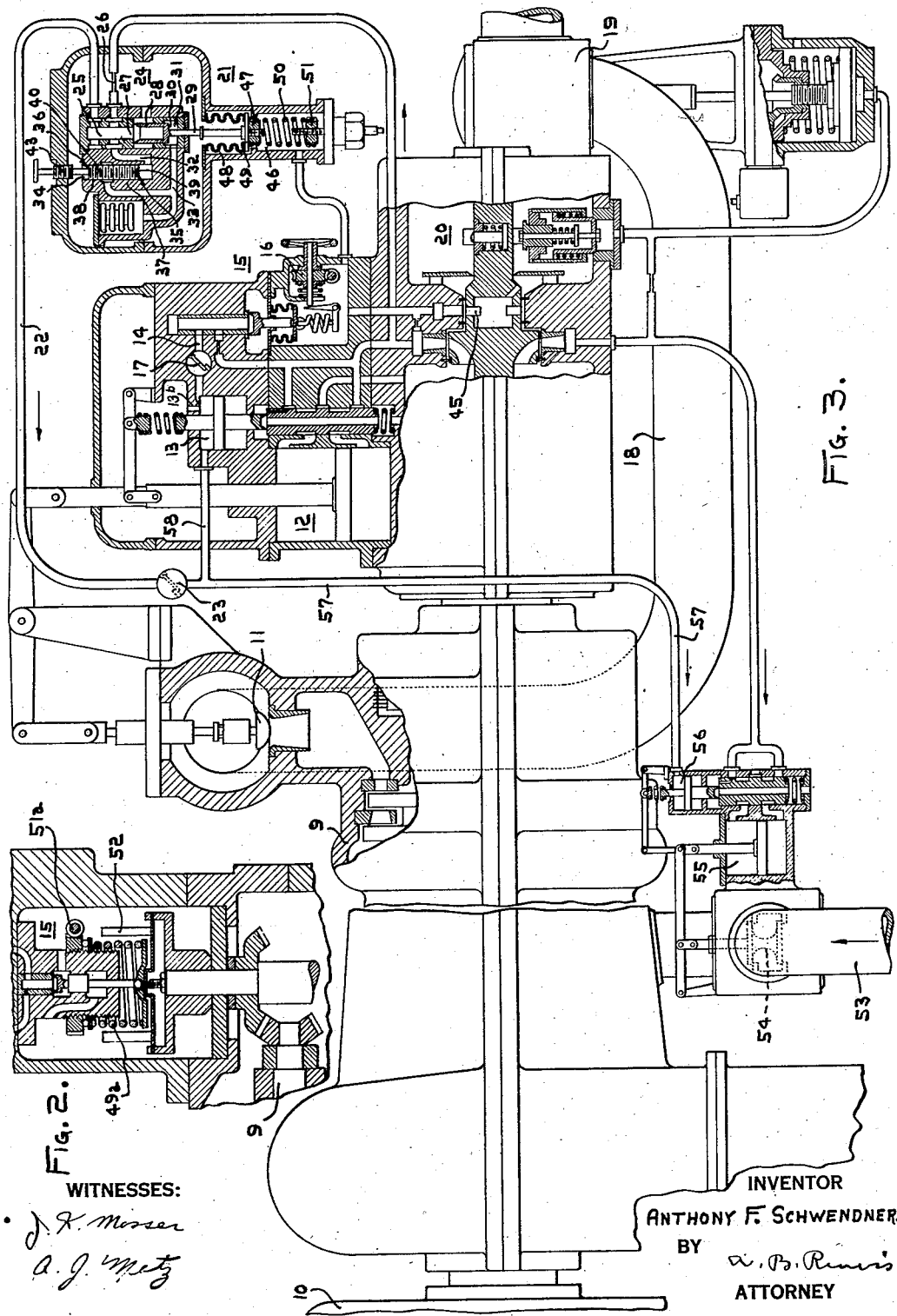
WITNESSES:
INVENTOR
ANTHONY F. SCHWENDNER.
BY
ATTORNEY

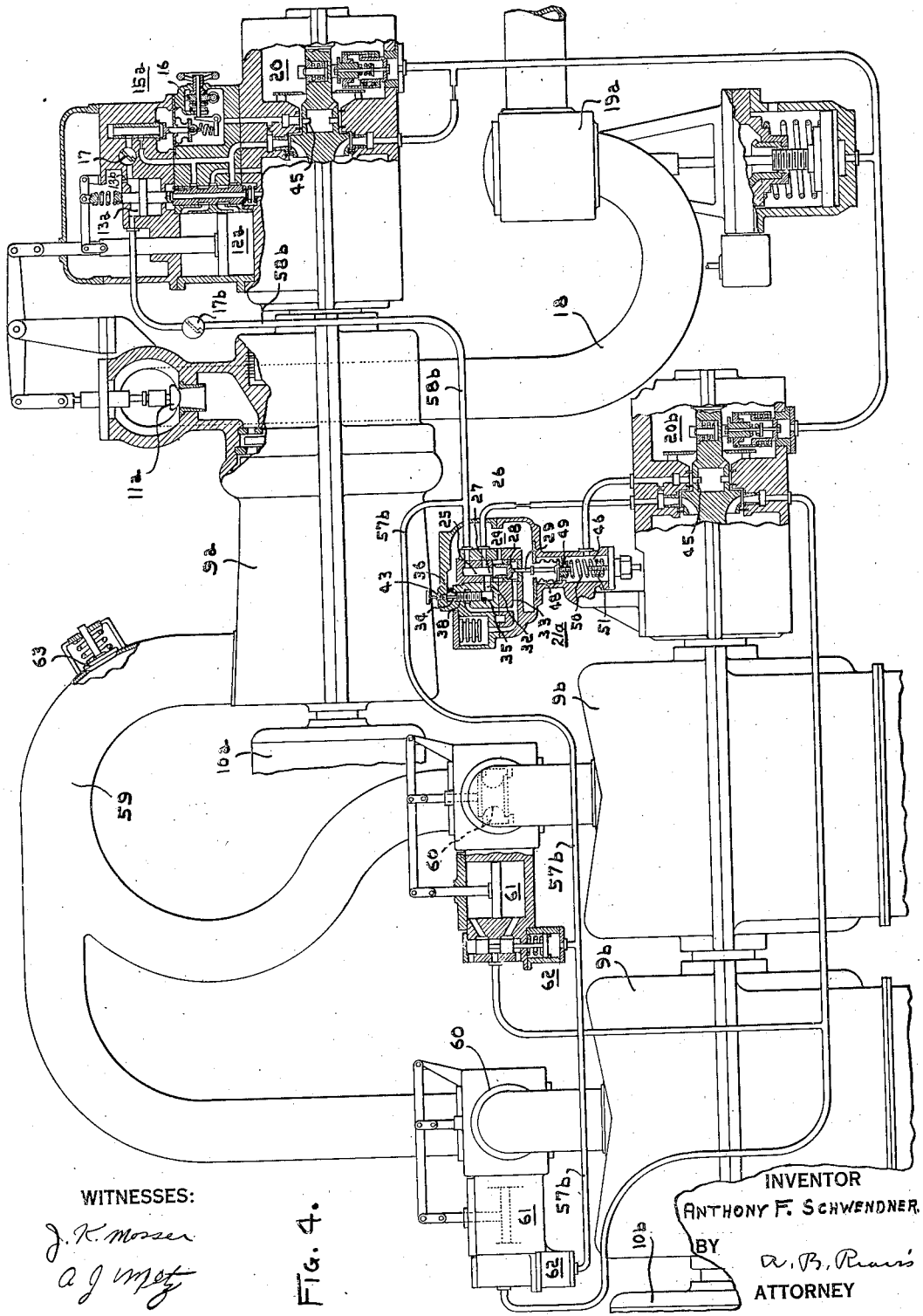

UNITED STATES PATENT OFFICE 2,390,740

GOVERNING APPARATUS

Anthony F. Schwendner, Ridley Park, Pa., assignor to Westinghouse Electric Corporation, East Pittsburgh, Pa., a corporation of Pennsylvania Application May 26, 1942, Serial No. 444,538

9 Claims. (Cl. 60—43)

The invention relates to governing mechanism for a turbine installation.

Where a turbo-generator operates as a base load machine, it is desirable to provide a governor having a reasonably wide regulating speed range to avoid disturbances in the load carried by the turbine; however, the achievement of this objective may be at the risk of overspeeding, in the event of full or partial load dump, sufficiently to cause the emergency governor to become effective to close the throttle valve. As closure of the throttle valve involves again starting the turbine, measures should be taken to prevent operation of the wide speed range governor leading to this result. Therefore, in addition to said governor, which is referred to as the primary governor, there is provided a secondary governor having a relatively narrow regulating speed range, the secondary governor becoming effective when the turbine increases in speed to a predetermined extent above normal and serving to close the admission valve at a speed well below the speed at which such valve would be closed by the primary governor and safely below that at which the emergency governor becomes operative. For example, assuming that the primary governor has a regulating speed range of 6 or 8 per cent and that the emergency governor has the usual setting to respond to 10 per cent overspeed, if the secondary governor has a speed regulation of 1 per cent or less and is set to come into operation at 2 per cent above normal speed, it will be apparent that the second governor will assume control just as soon as the turbine reaches a speed 2 per cent above normal and that the admission valve will be closed by that governor when the speed reaches 3 per cent above normal. Thus, it will be apparent that, by setting the secondary governor to govern at a speed just above the normal speed carried on the system and within the regulating speed range of the primary governor, the latter normally controls the turbine; however, in the event of partial or sudden load drop, the turbine speed is accelerated until control of the admission valve is assumed by the secondary governor, and, as the latter has a very narrow speed regulating range, it is operated to close the admission valve at a speed well below the speed at which the emergency governor would become operative. Assuming that control of the turbine has been assumed by the secondary governor and it is desired to have control resumed by the primary governor, then the speed changer of the latter is adjusted until this result is achieved.

Accordingly, the invention has for an object to control the admission of steam to a turbine by means of primary and secondary governors constructed and arranged so that the primary governor normally controls the admission of steam, but, in the event of full or partial load dump resulting in increase in speed to a predetermined extent, the secondary governor assumes control to prevent continuance of increase in speed to such an extent as to result in operation of the emergency governor.

Where a high-pressure turbine driving a generator supplies steam to one or more low-pressure turbines, each driving its generator, a governor is customarily employed to control the admission of steam to the high-pressure unit and each turbine is equipped with an auto-stop or emergency governor. With this arrangement, if the decline in load is sufficiently rapid, the steam in the cross-over connection may accelerate the low-pressure turbine unit or units sufficiently to operate their emergency or auto-stop governors. Therefore, a further object of the invention is to provide, for each low-pressure turbine unit, a valve in the low-pressure supply line together with a governor for the valve, the governor being effective at a desired speed above normal and speed compensated so that it does not interfere with normal control by the main governor of steam to the high-pressure and low-pressure turbine units, but, in the event that the speed of the low-pressure unit or units should reach a predetermined value above normal and below the setting of the overspeed or emergency governor or governors, the governors will be operated, not only to control the valve in the low-pressure supply line, but the main admission valve as well.

More particularly, a further object of the invention is to provide, with an installation including a high-pressure turbine unit having a cross-over connection to one or more low-pressure turbine units and having its steam supply normally controlled by a governor, an intercepting valve for each low-pressure turbine unit and under control of an additional governor, which is speed compensated for a small percentage of regulation, for example, 1 per cent, and set to become effective or govern at a desired percentage, for example, 2 or 3 per cent above normal speed, whereby the intercepting valve or valves may be closed with a rise in speed of 3 or 4 per cent, in spite of the fact that the main governor controlling the supply of steam to the installation has a regulation of 6 or 8 per cent. Thus, with a speed-compensated additional governor having its speed setting suitably adjusted, the installation may normally operate with the usual regulation and without interference by the additional governor, while at the same time it is assured that, should the speed of a low-pressure turbine unit exceed a predetermined amount, the additional governor closes both the admission and the intercepting valves. In addition to guarding against operation of an emergency governor because of acceleration due to steam in the cross-over connection in the event of sudden load drop, control of the installation by the main governor at the lower speed may be rapidly resumed by adjusting the speed changer thereof.

These and other objects are effected by the invention as will be apparent from the following description and claims taken in connection with the accompanying drawings, forming a part of this application, in which:

Fig. 2 is a detail sectional view showing a modified form of governor;

Fig. 3 is a view similar to Fig. 1, but showing a modified form of the controlling arrangement; and Fig. 4 shows a further embodiment of the invention.

Figure 1:
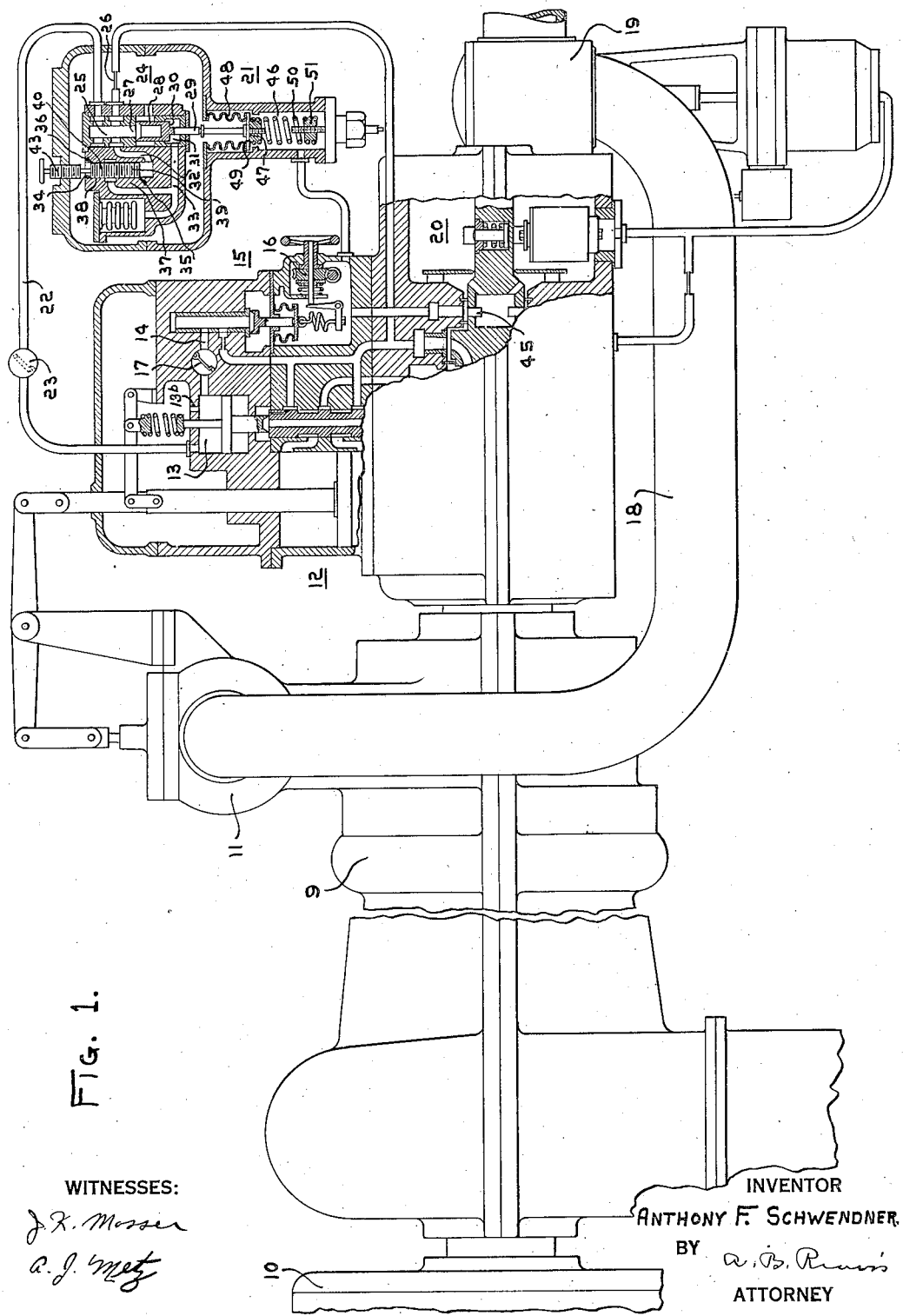
Fig. 1 is a diagrammatic view showing a turbine installation having the improvement applied thereto.

In Fig. 1, there is shown a turbine 9 coupled to the generator 10 and having an admission valve 11 operated by servo-motor apparatus, at 12, provided with a pressure-responsive control device, at 13, to which fluid under pressure is supplied by the passage 14 from the primary governor, at 15, preferably of the hydraulic type and having a speed changer 16. The passage 14 is provided with a check valve 17 for the purpose hereinafter referred to. As is customary with the general type of pressure-responsive control device shown, the housing thereof has a bleeder port 13b, which, not only permits of escape of air or gas, but also allows for bleeding or leaking of oil so that the device may operate in response to reduction in pressure of fluid supplied thereto.

The admission valve 11 is supplied with steam by means of the conduit 18 provided with a throttle valve 19 which is closed pursuant to operation of the emergency governor, at 20, the latter usually being adjusted and effective at about 10% overspeed.

Where the turbine is used as a base load machine, it is desirable that the primary governor, at 15, should have a fairly wide regulating speed range, for example, 6 or 8%; however, with such a wide range, in the event of full or partial load dump, the turbine may overspeed sufficiently to operate the emergency governor and close the throttle valve. Therefore, the turbine is equipped with a secondary governor, at 21, also preferably of the hydraulic type, and connected by a passage 22 to the servo-motor pressure-responsive device, at 13, the passage 22 having a check valve 23 for the purpose hereinafter pointed out.

The secondary governor, is adjusted for operation at a speed of the turbine in excess of the normal speed of the latter a predetermined small extent, for example, 2 or 3 per cent above normal, and it has such a narrow regulating speed range that it restricts the steam to prevent the attainment of a speed adequate to render the emergency governor effective.

With the pressure-responsive device, at 13, being supplied with liquid under pressure from the governor, at 15, the check valve 23 prevents the back flow of liquid under pressure through the conduit 22 to the governor, at 21. On the other hand, should the governor, at 21, be supplying liquid under pressure to the pressure-responsive device, the check valve 17 prevents back flow to the governor, at 15.

The governor apparatus, at 21, is comprised by transformer apparatus, at 24, providing fluid under pressure for the passage 22 and the pressure-responsive device, at 13, of the admission valve servo-motor, the transformer being provided with means, hereinafter described, to which force dependent upon turbine speed may be applied to control the pressure.

The pressure transformer, at 24, includes structure providing a space, at 25, which communicates with the passage 22, fluid under pressure being supplied to the space, at 25, by an orifice 26 communicating with any source of suitably high pressure. Fluid pressure in the space, at 25, is controlled by means of an escape port 27 with which cooperates a valve 28 associated with an operating member 29 to which force dependent upon turbine speed is applied.

Preferably, the valve 28 is of the cup type and it presents an area subject to fluid pressure existing in the space 25. The cup valve is formed to provide an additional pressure area 30 equal to and in opposed relation with respect to the area provided by the cup valve 28. The piston area 30 is exposed to pressure in the chamber 31. With absence of fluid pressure in the chamber 31, the governor would have the usual regulation, that is, there would be a percentage of speed change from no load to full load to make operation possible. If pressure is provided in the chamber 31, the effect thereof is to reduce the speed change due to load change, and the more this pressure is increased the greater the extent of speed correction until, with equality of pressures in the space 25 and in the chamber 31, the isochronous condition is reached.

To provide stability, the arrangement should be such that change in pressure in chamber 31 lags a desired slight amount with respect to change in the space 25. This result is conveniently achieved by the use of an orifice and an accumulator or airbell. If partial speed compensation would not raise the speed too close to the emergency tripping speed, it is preferably employed. Therefore, there is shown means for controlling pressure in the chamber 31. A first passage 32 communicates with the space, at 25, a second passage 33 communicates with the pressure chamber 31, and there is provided a drain space 34. A viscous orifice, at 35, for example, is arranged between the first and second passages 32 and 33, and a second viscous orifice, at 36, is arranged between the second passage 33 and the drain space 34. It is characteristic of a viscous orifice that the pressure drop or resistance varies with the length and the flow varies directly as the pressure drop and not as the square root thereof, that is, it has a linear relation as between flow and pressure drop. Hence, adjustment in length results in a proportionate adjustment in pressure drop or pressure.

As shown, the first and second viscous orifices, at 35 and 36, are adjustable to vary the lengths thereof, the first orifice, at 35, being shortened to increase the pressure in the chamber 31 and the second orifice, at 36, being lengthened and vice versa, the length of the first orifice being varied to vary the pressure in the chamber 31 with preservation of the same total orifice length of the first and second orifices between the first passage 32 and the drain passage 34. The advantage of the arrangement illustrated is that changes in viscosity do not affect the pressure provided in the chamber 31, for the reason that any change in viscosity affects the orifices equally.

The viscous orifice arrangement is more particularly described and claimed in the application of O. N. Bryant, Serial No. 443,777, filed May 20, 1942 (now Patent No. 2,323,115, dated June 29, 1943), and assigned to the assignee of the present application. Each orifice embodies inner and outer members, one or both of which are threaded to provide a helical viscous flow passage and the members being shortened to vary the length of the flow passage. As shown, the viscous orifices, at 35 and at 36, embody outer members 37 and 38 with which cooperate inner members 39 and 40, the inner members preferably being unitary, as illustrated. Either or both of the inner and outer members or the orifices may be threaded to provide helical viscous flow passages. The unitary inner members 39 and 40 are adjustable axially to vary the lengths of the orifice passages, one passage being shortened while the other is lengthened, and vice versa, in order that the length of the passage of the orifice, at 35, be varied while maintaining the length of passages of both orifices, at 35 and 36, between the passage 32 and the drain space 34 constant. Any suitable means 43 may be provided for adjusting the inner members of the viscous orifices.

The operating member 29 may have force applied thereto in any suitable manner. As shown, an impeller 45 driven by the turbine provides liquid whose pressure varies substantially as the square of the turbine speed and the liquid is supplied to the chamber 46 formed in part by the abutment 47 and the bellows 48 connected thereto. The abutment 47 engages the lower end of the operating member 29 and it has a pressure area or face 49 exposed to pressure in the chamber 46. The force of liquid pressure applied to the abutment 47 is opposed by that of the load spring 50 whose face may be varied by the adjusting apparatus 51.

By adjusting the apparatus 51, the force of the load spring 50 may be altered to alter the governing speed. By this means, the secondary governor may be set to govern at a speed 2 or 3 per cent above normal. But for the feature of speed compensation for load change, this overspeed adjustment coupled with the normal regulation, which would then be inherent in the secondary governor, might mean overspeeding to the point where the emergency governor would be rendered effective. Therefore, instead of the secondary governor having the usual regulation, its regulation is reduced to 1 per cent or less by means of the speed compensator. Thus, while the secondary governor, at 21, is set by means of the speed adjusting device 51 to start closing the admission valve at 2 or 3 per cent overspeed, whereby interference with normal control by the primary governor, at 15, is avoided, yet, in the event of sudden load drop and consequent overspeeding, the secondary governor comes into play at the set overspeed to start closing the admission valve and the latter is completely closed with a very small speed change due to load change because of the speed compensator.

In Fig. 2, instead of the speed-responsive force being provided by fluid pressure, it is provided by flyweights 52 whose force acts against the load spring 49a connected to the speed adjusting device 51a.

In Fig. 3, there is shown an arrangement which is similar to Fig. 1, except that the turbine is equipped with an induction line 53 for supplying steam to a suitable intermediate stage. A valve 54 is arranged in the line 53 and it is controlled by means of a servo-motor, at 55, having a pressure-responsive control device 56. Liquid under controlling pressure is supplied from either the primary governor, at 15, or the secondary governor, at 21, by means of the conduit 57, the latter being connected to the conduit 22 of the governor, at 21, and being connected by the passage 58, the pressure-responsive device 13, and the passage 14 to the governor, at 15. Thus, it will be seen that when the governor, at 15, is effective, it supplies liquid under pressure for controlling both the admission valve 11 and the induction valve 54, the check valve 23 preventing back flow to the governor, at 21. If the governor, at 21, is effective, both of the valves are controlled thereby, the check valve 17 operating to prevent any back flow of liquid to the governor, at 15.

In Fig. 4, there is shown an embodiment of the invention applied to a cross-compound turbine installation comprising the high-pressure turbine 9a joined by the cross-over connection 59 to one or more low-pressure turbines 9b. The turbines 9a and 9b drive generators 10a and 10b connected in parallel to an electrical system in the customary manner.

The high-pressure turbine 9a has an admission valve 11a controlled by the primary governor, at 15a; however, instead of the secondary governor, at 21a, being operated by the same turbine, as in Fig. 1, it is operated by the low-pressure turbine 9b. Also, the low-pressure turbine has an emergency governor, at 20b, responsive to overspeeding to bring about closing of the throttle valve 19a.

The operations already described in connection with Fig. 1 also occur in the embodiment of Fig. 4; and, in addition, in case the entrapped steam in the cross-over connection is sufficient to accelerate the low-pressure turbine, in the event of partial or full load dump, intercepting valves 60 control communication of the cross-over connection with the low-pressure turbines and prevent such acceleration of the latter.

The intercepting valves 60 are opened and closed by servo-motors, at 61, each having a pressure-responsive control device, at 62, and the pressure-responsive control devices are supplied with liquid under pressure by means of the conduit 57b of the secondary governor, at 21a, the latter governor also having a conduit passage 58b communicating with the pressure-responsive device of the servo-motor, at 12a. A check valve 17b normally interrupts the conduit 58b when the primary governor, at 15a, is effective, but, when the secondary governor, at 21a, becomes effective, it allows for the transmission of fluid under pressure from the latter to the pressure-responsive device, at 13a, of the servo-motor, at 12a.

As the primary governor, at 15a, has a fairly wide regulating speed range, for example, of the order of 6 or 8 per cent, and as apparatus of this character may accelerate with a high degree of rapidity when partial or full load dump occurs, it is necessary to resort to other means of control, otherwise the primary governor may not act quick enough to prevent the attainment of a speed sufficient to render the emergency governor effective to bring about closing of the throttle valve. Therefore, as in Fig. 1, a secondary governor is is used, and it is set to become effective at a speed higher to a predetermined extent than the normal speed but well below the overspeed at which the emergency governor becomes effective. For example, as in Fig. 1, the secondary governor may be set to become effective at 2 or 3 per cent above the normal speed.

As the secondary governor is speed compensated, it may have a desirably narrow regulating speed range, for example, 1 per cent or less. Assuming that the secondary governor is set to become effective at 2 per cent overspeed, then, when the speed reaches 3 per cent, the valves will be completely closed, the secondary governor, at 21a, bringing about closing of the intercepting valves 60, as well as closing of the admission valve 11a. As the generators 10a and 10b of the high and low-pressure turbines are connected together electrically, it will be apparent that the primary and secondary governors are capable of operating to control the valves 11a and 60 in the same manner as they would be controlled if the secondary governor, at 21a, were operated by the high-pressure turbine 9a; however, other reasons, for example, interruption of the electrical connection between the high and low-pressure turbines, make it desirable to have the secondary governor operated from a low-pressure turbine.

Regardless of what may happen, as soon as the low-pressure turbine overspeeds 2 per cent, the intercepting valves close and pressure supplied through the line 58b acts on the servo-motor, at 12a, to bring about movement of the valve 11a in a closing direction to restrict the supply of steam so as to avoid overspeeding to an extent sufficient to trip the emergency governor and close the throttle valve. In addition to movement of the admission valve 11a in a closing direction tending to restrict acceleration of the high-pressure turbine, the building up of back pressure in the cross-over connection 59 when the intercepting valves 60 are closed also tends to achieve the same purpose for the reason that the pressure drop across the high-pressure turbine is thereby reduced. To limit the attainable pressure in the cross-over connection, the latter is preferably provided with a relief valve 63 set to open at a predetermined pressure. The term "turbine installation," as used herein, has the significance of one or more turbine units having a single passage through which the flow of steam is controlled by the governors in the manner described.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. In a turbine installation having a throttle valve closed in response to a predetermined overspeed, a governor valve, a primary governor responsive to turbine installation speed and having such a wide regulating speed range that the turbine installation may attain said predetermined overspeed, a secondary governor responsive to turbine installation speed, speed-changing means providing for relative adjustment of the governors such that the secondary governor has its regulating speed range within that of the primary governor but beginning at a speed above normal but below said predetermined overspeed, and speed-compensating means for the secondary governor providing for such a narrow regulating speed range thereof that it is effective to operate the governor valve to restrict the flow of elastic fluid sufficiently to prevent the attainment of said predetermined overspeed by the turbine installation.

2. The combination as claimed in claim 1 wherein the speed-compensating means includes means providing for narrowing of the speed-regulating range of the secondary governor to a desired extent.

3. The combination as claimed in claim 1 wherein the speed-changing means includes a speed changer for the primary governor providing for adjustment of the latter to increase its governing speed setting incident to regaining control of the turbine installation from the secondary governor.

4. In a turbine installation having a throttle valve closed in response to a predetermined speed, a governor valve; pressure-responsive means for controlling the governor valve; a primary governor responsive to speed of the turbine installation and providing fluid under controlling pressure; a secondary governor responsive to speed of the turbine installation and providing fluid under controlling pressure; said secondary governor including means for adjusting its speed setting and means for compensating to a substantial extent for speed change thereof due to load change; conduits for supplying fluid under controlling pressures from the governors to the pressure-responsive means; and check valves in the conduits for isolating the primary governor from fluid under controlling pressure supplied by the secondary governor and vice versa.

5. In a turbine installation having a throttle valve closed in response to a predetermined overspeed, a governor valve, an induction passage for supplying steam to an intermediate stage of the turbine installation, an induction valve for controlling flow through the induction passage, primary and secondary governors for alternatively controlling both the governor and induction valves, the primary governor having a wide regulating speed range and the secondary governor having a narrow regulating speed range, and means for setting the secondary governor so that it is normally ineffective but becomes effective upon increase in turbine installation speed to an extent such that it is assured that the governor and induction valves shall restrict the flow of steam to the turbine installation sufficiently to prevent the attainment of an overspeed adequate to bring about closing of the throttle valve.

6. In a turbine installation having a throttle valve closed in response to a predetermined overspeed, a governor valve; an induction passage for supplying steam to an intermediate stage of the turbine installation; an induction valve for controlling the flow of steam through the induction passage; primary and secondary governors operated by the turbine installation; and means actuated by each governor for controlling both the governor and induction valves; said secondary governor including means for adjusting its speed setting so that it is normally ineffective but becomes effective upon increase in turbine installation speed to an extent such that it is assured that the governor and induction valves shall restrict sufficiently the flow of steam to the turbine installation to prevent the attainment of an overspeed adequate to bring about closing of the throttle valve.

7. In a turbine installation having a throttle valve closed in response to a predetermined overspeed, a governor valve; an induction passage for supplying steam to an intermediate stage of the turbine installation; an induction valve for controlling the flow of steam through the induction passage; primary and secondary governors operated by the turbine installation; and means actuated by each governor for controlling both the governor and induction valves; said secondary governor including means for adjusting its speed setting, means for reducing the speed change thereof due to load change, and means for adjusting the last-named means.

8. In a turbine installation having a throttle valve closed in response to a predetermined overspeed and including a high-pressure turbine joined by a cross-over connection to a low-pressure turbine, an admission valve for the high-pressure turbine, an intercepting valve for the cross-over connection and located adjacent to the low-pressure turbine, a primary governor operated by the high-pressure turbine, a secondary governor operated by the low-pressure turbine, said primary governor having a wide regulating speed range and said secondary governor having a narrow regulating speed range, means actuated by the primary governor to control the admission valve, means actuated by the secondary governor to control both the admission and intercepting valves, and means for setting the secondary governor so that it is normally ineffective but becomes effective upon increase in speed to an extent such that it is assured that the valves shall restrict the supply of steam to the turbines sufficiently to prevent the attainment of an overspeed adequate to bring about closing of the throttle valve.

9. The combination with a turbine installation including a high-pressure unit for supplying motive fluid through a cross-over connection to one or more low-pressure units, of a primary governor normally controlling the supply of motive fluid to the installation; a valve in the cross-over connection for each low-pressure turbine unit and located adjacent to the latter; and a secondary governor responsive to low-pressure turbine unit speed and operatively connected to the valve or valves; said secondary governor including means for adjusting its speed, means for effecting reduction in speed change due to load change, and means for adjusting the last-named means.

ANTHONY F. SCHWENDNER.